US009021085B1

(12) United States Patent
Jensen

(10) Patent No.: US 9,021,085 B1
(45) Date of Patent: Apr. 28, 2015

(54) METHOD AND SYSTEM FOR WEB FILTERING

(75) Inventor: Wayne Jensen, Morgan Hill, CA (US)

(73) Assignee: Trend Micro Incorporated, Tokyo (JP)

( * ) Notice: Subject to any disclaimer, the term of this patent is extended or adjusted under 35 U.S.C. 154(b) by 904 days.

(21) Appl. No.: 13/155,680

(22) Filed: Jun. 8, 2011

(51) Int. Cl.
H04L 12/58 (2006.01)
H04L 29/06 (2006.01)
H04L 29/08 (2006.01)

(52) U.S. Cl.
CPC ............ H04L 51/12 (2013.01); H04L 63/0236 (2013.01); *H04L 29/0809* (2013.01)

(58) Field of Classification Search
CPC . H04L 29/0809; H04L 51/12; H04L 63/0227; H04L 63/0236
USPC .................. 709/219, 224, 225, 246
See application file for complete search history.

(56) References Cited

U.S. PATENT DOCUMENTS

| 7,516,219 | B2 * | 4/2009 | Moghaddam et al. ........ 709/225 |
| 7,792,994 | B1 * | 9/2010 | Hernacki ...................... 709/245 |
| 2004/0006621 | A1 * | 1/2004 | Bellinson et al. ............. 709/225 |
| 2004/0073707 | A1 * | 4/2004 | Dillon ........................... 709/245 |
| 2008/0072249 | A1 * | 3/2008 | Hovnanian et al. ............. 725/34 |
| 2008/0250484 | A1 * | 10/2008 | Chong et al. ....................... 726/7 |
| 2008/0281696 | A1 * | 11/2008 | Whitehead ....................... 705/14 |
| 2012/0213094 | A1 * | 8/2012 | Zhang et al. .................. 370/252 |
| 2013/0263263 | A1 * | 10/2013 | Narkolayev et al. ............ 726/22 |

OTHER PUBLICATIONS

".htaccess Redirect from IP Address to Domain? Is this possible?", http://www.webmasterworld.com/apache/3655980.htm, pp. 1-2, May 2008.*

* cited by examiner

*Primary Examiner* — Brandon Renner
*Assistant Examiner* — Scott M Sciacca
(74) *Attorney, Agent, or Firm* — Okamoto & Benedicto LLP

(57) ABSTRACT

A technique for web filtering includes monitoring and recording completed DNS (domain name service) transactions involving a user computer. The user computer may thereafter issue an HTTP (hypertext transport protocol) request to a remote server computer, with the HTTP request including an IP address of the server computer instead of its domain name. The HTTP request may be correlated with the recorded completed DNS transactions to obtain the domain name of the server computer. The domain name of the server computer may be employed to determine the reputation of the domain name for web filtering purposes.

12 Claims, 3 Drawing Sheets

METHOD AND SYSTEM FOR WEB FILTERING

BACKGROUND OF THE INVENTION

1. Field of the Invention

The present invention relates generally to computer security, and more particularly but not exclusively to methods and apparatus for web filtering.

2. Description of the Background Art

Some private computer networks have security policies that prohibit end users from accessing particular remote resources, such as certain websites and servers. For example, a corporation may prohibit employees from accessing some remote servers from within the corporate network. As another example, parents may choose to block particular websites from being accessed by their children. Access to remote resources may be controlled using commercially available policy enforcement products. These products may evaluate acceptability of a remote resource by domain name. For example, a policy enforcement product may receive a domain name of a resource being accessed by a user and block access to the resource based on the rating or category of the domain name. Some users circumvent policy enforcement by accessing a resource without using the resource's domain name. For example, a user may access a server by replacing domain names in uniform resource locators with an equivalent numeric IP (Internet protocol) address.

SUMMARY

In one embodiment, a computer-implemented method of web filtering includes monitoring DNS (domain name service) queries from a user computer. Records of completed DNS transactions of the monitored DNS queries from the user computer are stored. An HTTP (hypertext transport protocol) request from the user computer to a remote server computer is received, the HTTP request including an IP (internet protocol) address of the remote server computer instead of the domain name of the remote server computer. The IP address of the remote server computer is extracted from the HTTP request. Using the extracted IP address of the remote server computer, the stored records of completed DNS transactions from the user computer are searched for the domain name of the remote server computer. A reputation of the domain name of the remote server computer is obtained. A computer security policy is enforced based on the reputation of the domain name of the remote server computer.

In another embodiment, a system for web filtering comprises a first computer in a private computer network, the first computer being configured to transmit an HTTP request to a second computer that is outside the private computer network, the HTTP request including an IP address of the second computer instead of a domain name of the second computer. The system further comprises a third computer configured to receive the HTTP request, to extract the IP address of the second computer, to use the extracted IP address of the second computer to search a datastore of records of DNS transactions involving the first computer, to obtain the domain name of the second computer from the datastore, to use the domain name of the second computer to obtain a reputation of the domain name of the second computer, and to block the HTTP request depending on the reputation of the domain name of the second computer.

In another embodiment, a computer-implemented method of web filtering comprises monitoring and recording network service requests from a user computer. A current network service request is received from the user computer. The current network service request is correlated with previously recorded network service requests from the user computer. A web filtering decision to allow or block the current network service request is rendered using information from correlating the current network service request with the previously recorded network service requests.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Possible ways of combating use of an IP address instead of a domain name to circumvent web filtering include performing reverse domain name service (DNS) lookups at a runtime at a web filter and including IP addresses directly in a database of URL categories and ratings. Performing reverse DNS lookups at runtime present several disadvantages. First, the DNS provider for the web filter must support so called "PTR records". Second, performing PTR record lookups adds more latency to processing web requests. Third, IP addresses may map to more than one domain name. This third disadvantage is particularly troublesome because legitimate content delivery networks, such as Akamai, may assign a single IP address to multiple domain names. Including IP addresses directly in a database of URL categories and ratings also has the problem of ambiguity in mapping IP addresses back to domain names.

Figure 1:
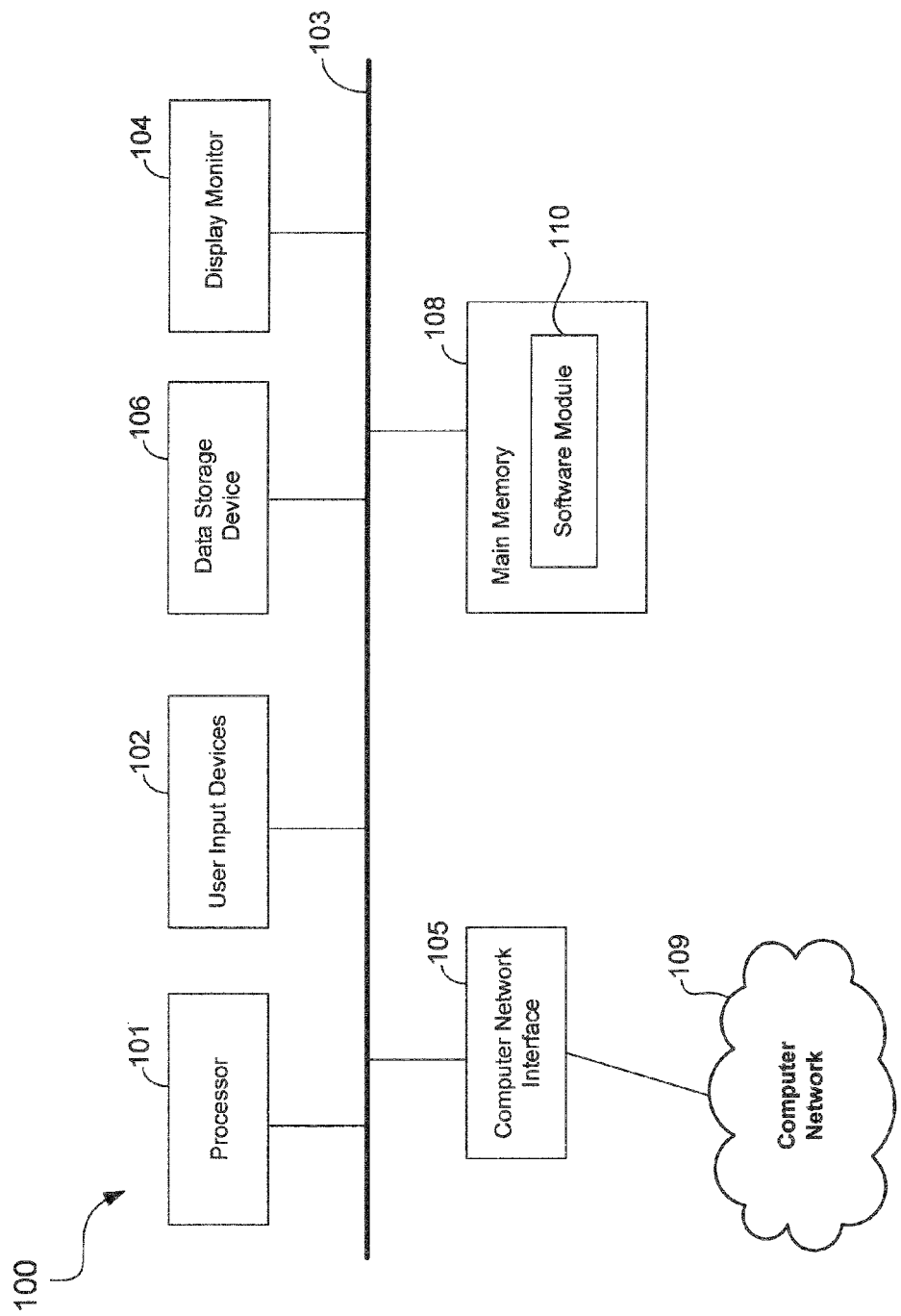
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as gateway computer, a server computer, or other computer described below. The computer 100 may have fewer or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. The software modules 110 may be loaded from the data storage device 106 to the main memory 108. The software modules 110 may also be made available in other computer-readable medium including optical disk, flash drive, and other memory device. The software modules 110 may comprise computer-readable program code (i.e., software) components of a web filtering system 220 show in FIG. 2, for example.

Figure 2:
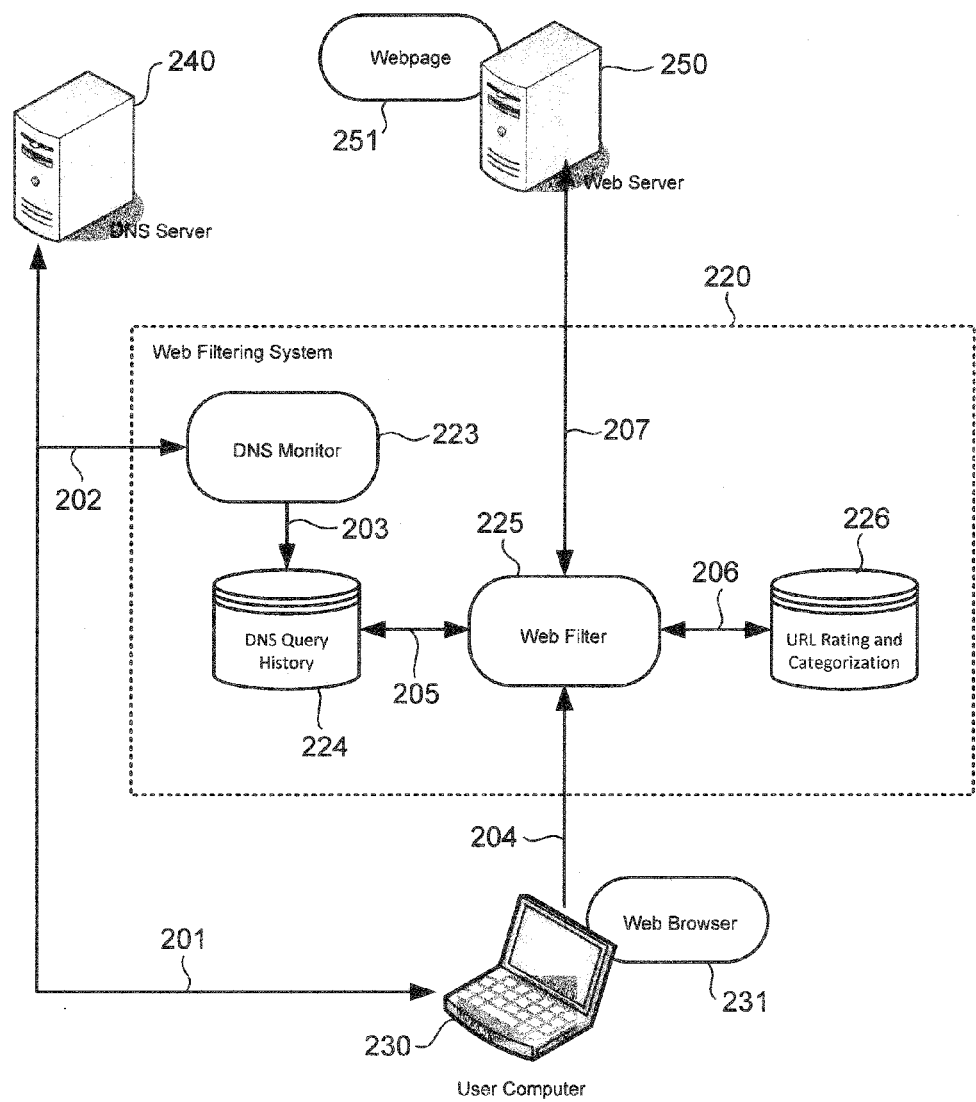
FIG. 2 shows a flow diagram schematically illustrating operation of a web filtering system in accordance with an embodiment of the present invention.

FIG. 2 shows a flow diagram schematically illustrating operation of a web filtering system 220 in accordance with an embodiment of the present invention. The web filtering system 220 is configured to enforce computer security policies that prohibit access to particular remote resources. In the example of FIG. 2, the web filtering system 220 is part of a private computer network that includes one or more user computers 230. The web filtering system 220 is deployed such that all network traffic from a user computer 230 within the private computer network to a remote (i.e., outside the private computer network) resource, such as a web server 250 on the Internet, goes through the web filtering system 220.

In the example of FIG. 2, the web filtering system 220 comprise a web filter 225, a URL rating and categorization datastore 226, a DNS monitor 223, and a DNS query datastore 224. As can be appreciated, the web filtering system 220 may be implemented in one or more server computers. In one embodiment, the DNS monitor 223, the datastore 224, and the web filter 225 are implemented in a server computer or a network security appliance providing gateway functionality in the private computer network, while the datastore 226 is implemented in a separate server computer outside the private computer network and accessible on the Internet. In other embodiments, the web filtering system 220 is implemented as part of a cloud computing infrastructure. The web filtering system 220 may also have other configurations without detracting from the merits of the present invention. For example, the datastore 226 may also be implemented as a local database, such as in the same computer as the web filter 225 or in a separate computer within the same private network as the web filter 225. Similarly, the DNS monitor 223 and the datastore 224 may be implemented in a computer separate from the web filter 225 but within the same private network as the web filter 225.

The web filter 225 may comprise computer-readable program code for enforcing computer security policies relating to access to remote resources. In one embodiment, the web filter 225 is configured to examine HTTP (hypertext transport protocol) traffic, extract a URL from the HTTP traffic, pass the URL to the datastore 226 to determine a rating and/or category of the URL, and perform an enforcement action based on the rating and/or category of the URL. A remote resource may be assigned a rating based on the desirability or legitimacy of the resource, or a category depending on the type of content or service provided by the resource. An example computer security policy of the private computer network may be to prohibit users from accessing remote resources of a particular category (e.g., pornography websites) or those having a particular rating. The web filter 225 may be implemented as an in-line proxy or a passive traffic sniffer, and deployed as an organizational gateway or a single endpoint service.

The URL rating and categorization datastore 226 may comprise a database containing reputations of domain names and an interface for accessing the database. The reputation of a domain name may include a rating, category, and/or other computer security-related information about the domain name. The datastore 226 may accept a URL as input, and return a category and/or threat rating of the URL. The datastore 226 may be implemented as a local database or as a remote service. For example, the datastore 226 may be provided by the Web Reputation Service of Trend Micro Inc.

The DNS monitor 223 may comprise computer-readable program code for monitoring and recording DNS traffic to and from user computers, such as the user computer 230. In one embodiment, the DNS monitor 223 examines all DNS traffic in an organization or on an endpoint, and correlates the IP address of a client issuing a DNS request, a domain name included in the request, and the IP addresses for the domain name included in the DNS response. For each completed DNS transaction, i.e., completed DNS request and corresponding response, the DNS monitor 223 may dispatch a message to the DNS query history datastore 224 to insert a corresponding record of the DNS transaction. The DNS monitor 223 may be implemented as a passive network sniffer, or a monitor of request logs produced by a DNS server.

The DNS query history datastore 224 may comprise an interface to insert records of completed DNS transactions, a database to store those records, and an interface to search for any previous DNS transactions that returned a given IP address, optionally limited to requests issued from a specific user computer. The records of completed DNS transactions may include a timestamp of when the DNS query took place, the IP address of the user computer that issued the request, the domain name included in the request, and the list of IP addresses returned in the DNS response.

When a user performs a DNS query (arrow 201), the DNS monitor 223 observes the DNS request from the user computer 230 to a DNS server 240 and corresponding DNS response from the DNS server 240 (arrow 202). The DNS monitor 223 inserts the DNS transaction as a new record into the DNS query history datastore 224 (arrow 203). The record of the DNS transaction may include a timestamp of when the DNS query took place, the IP address of the user computer 230, the domain name included in the request from the user computer 230, and the list of IP addresses returned in the corresponding DNS response from the DNS server 240. Because most computer users do not know the IP address of a remote resource, a user would initially use the domain name of the resource to access the resource and get its IP address. This gives an opportunity for the web filtering system 220 to obtain the IP address of a domain name accessed by the user, and store that information in the datastore 224.

Thereafter, when the user computer 230 issues an HTTP request (arrow 204) using an IP address instead of a domain name in the URL and Host header of the HTTP request, the web filter 225 searches the datastore 224 for any previous DNS request that contained that IP address in the corresponding DNS response (arrow 205). Optionally, for more accuracy, the web filter 225 may limit the search to DNS requests from the IP address of the user computer 230 and/or for DNS requests made within a predetermined time period (e.g., as indicated on the time stamp). If a matching record is found, then the domain name indicated in the previous DNS request is substituted for the IP address in the URL of the HTTP request and passed to the datastore 226 (arrow 206). In response, the datastore 226 returns the rating and/or category of the domain name to the web filter 225. If the rating and/or category of the domain name do not violate a defined computer security policy for the user, then the HTTP request is forwarded to the intended recipient (arrow 207). Otherwise, the HTTP request is denied, e.g., by blocking the HTTP request. As can be appreciated, the web filtering technique of the present invention provides a more accurate mapping of an IP address back to its domain name compared to those that employ a simple reverse DNS lookup because the mapping may be made based on actual DNS traffic from a user computer within a given time period.

Figure 3:
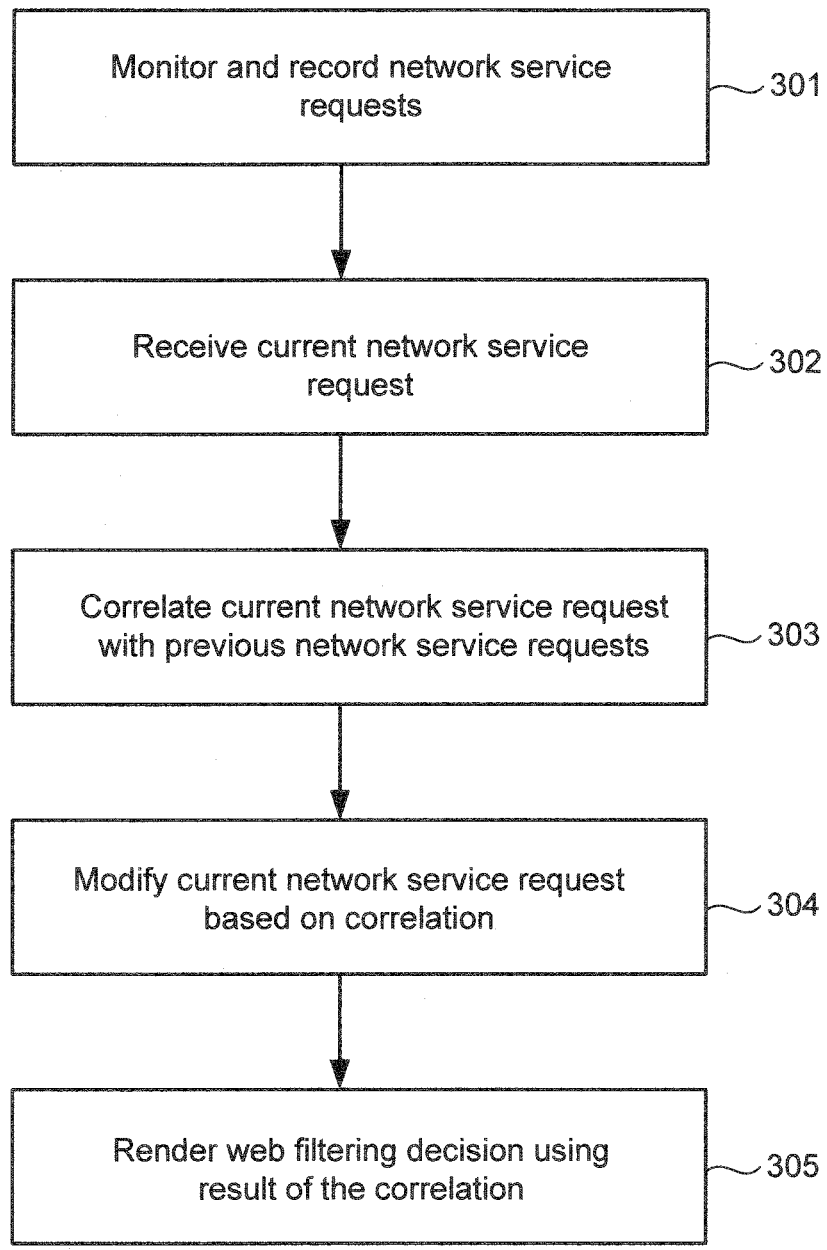
FIG. 3 shows a flow diagram of a method of filtering network service requests in accordance with an embodiment of the present invention.

FIG. 3 shows a flow diagram of a method of filtering network service requests in accordance with an embodiment of the present invention. The method of FIG. 3 is explained using components shown in FIG. 2 for ease of illustration. Other components may also be employed to perform the method of FIG. 3 without detracting from the merits of the present invention.

The method of FIG. 3 begins by monitoring and recording network service requests from particular computers (step 301), such as computers belonging to the same corporate or home network. In one embodiment, the network service requests comprise DNS queries. As a particular example, a user of the user computer 230 may use a web browser 231 to access a webpage 251 of a website hosted by the web server 250. In his first access attempt, the user may use the domain name of the web server 250 to access the webpage 251. Accessing the webpage 251 may involve a DNS query to the DNS server 240 to resolve the domain name of the web server 250 to its IP address. The DNS monitor 223 monitors and records information about the DNS query into the DNS query history datastore 224. The recorded information may include a timestamp of when the DNS query took place, the IP address of the user computer 230, the domain name of the web server 250 (included in the DNS request from the user computer 230), and the IP address of the web server 250 (included in the corresponding DNS response from the DNS server 240).

A current network service request is received after the monitoring and recording of previous network service requests (step 302). Continuing the above particular example, the user may subsequently access the web server 250 using the IP address of the web server 250 instead of its domain name. The user may do this to circumvent web filtering, such as in the case of a child accessing a mature oriented website banned by his parents by category. In that case, the HTTP request to access the web server 250 will have the IP address, instead of domain name, of the web server 250. The web filter 225 receives the HTTP request.

The current network service request is correlated with previous network service requests (303). Continuing the particular example, the web filter 225 extracts the IP address from the HTTP request and searches the DNS query history datastore 224 for completed DNS transactions involving the extracted IP address, finds the previous DNS transaction involving the extracted IP address, and obtains the domain name of the web server 250 from the previous DNS transaction. Optionally, the web filter 225 may limit its search to DNS transactions involving the user computer 230 and/or DNS transactions occurring within a given window of time.

The current network service request is modified based on the result of the correlation (step 304). Continuing the particular example, the web filter 225 modifies the HTTP request to replace the extracted IP address with the domain name of the web server 250. The web filter 225 forwards the domain name of the web server 250 to the URL rating and categorization datastore 226. The datastore 226 returns to the web filter 225 the reputation of the domain name, which may include a rating and/or category of the domain name.

The web filtering decision is rendered using a result of the correlation (step 305). Continuing the particular example, the web filter 225 blocks or allows the HTTP request from the user computer 230 to the web server 250 based on the reputation of the domain name. The web filter 225 may allow the HTTP request to pass to the web server 250 when the reputation of the domain name of the web server 250 does not violate a computer security policy for the user computer 230. For example, the reputation of the domain name may indicate that the domain name belongs to a permissible category of websites or has an acceptable rating. Otherwise, when the reputation of the domain name of the web server 250 violates a computer security policy for the user computer 230, the web filter 225 may block the HTTP request to the web server 250.

Techniques for performing web filtering have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of web filtering, the method comprising:
   monitoring DNS (domain name service) queries from a user computer;
   storing records of completed DNS transactions of t-he monitored DNS queries from the user computer;
   receiving an HTTP (hypertext transport protocol) request from the user computer to a remote server computer, the HTTP request including an IP (internet protocol) address of the remote server computer instead of a domain name of the remote server computer that corresponds to the IP address of the remote server computer;
   extracting the IP address of the remote server computer from the HTTP request;
   using the extracted IP address of the remote server computer, searching the stored records of completed DNS transactions from the user computer for the domain name of the remote server computer;
   obtaining the domain name of the remote server computer from the stored records of completed DNS transactions from the user computer;
   modifying the HTTP request, by a gateway that is separate from the remote server computer, by replacing the extracted IP address with the domain name of the remote server computer;
   obtaining, from a computer of a web reputation service, a reputation of the domain name of the remote server computer; and enforcing a computer security policy based on the reputation of the domain name of the remote server computer.

2. The method of claim 1 wherein the reputation of the domain name of the remote server computer comprises a category.

3. The method of claim 1 wherein the reputation of the domain name of the remote server computer comprises a rating.

4. The method of claim 1 further comprising:
   blocking the HTTP request when the reputation of the domain name of the remote server computer indicates that the domain name has a prohibited category.

5. The method of claim 4 wherein the prohibited category includes pornography.

6. The method of claim 1 wherein the se-arc-h searching of the stored records of completed DNS transactions from the user computer is limited to DNS queries performed within a given period of time.

7. The method of claim 1 wherein the stored records of completed DNS transactions from the user computer includes an IP address of the user computer and a timestamp.

8. The method of claim 1 wherein storing the records of completed DNS transactions of the monitored DNS queries from the user computer comprises:

> storing the IP address of the user computer, the IP address of the remote server computer, the domain name of the remote server computer, and a timestamp in a datastore.

9. A system for web filtering, the system comprising:

> a first computer in a private computer network, the first computer being configured to transmit an HTTP request to a second computer that is outside the private computer network, the HTTP request including an IP (internet protocol) address of the second computer instead of a domain name of the second computer that corresponds to the IP address of the second computer;
>
> a third computer that is separate from the second computer, the third computer being configured to receive the HTTP request, to extract the IP address of the second computer from the HTTP request, to use the extracted IP address of the second computer to search a datastore of records of DNS (domain name service) transactions involving the first computer, to obtain the domain name of the second computer from the datastore, to use the domain name of the second computer to obtain a reputation of the domain name of the second computer, to modify the HTTP request by replacing the extracted IP address of the second computer with the domain name of the second computer, and to block the HTTP request depending on the reputation of the domain name of the second computer; and
>
> a fourth computer to which the third computer sends the domain name of the second computer to obtain the reputation of the domain name of the second computer.

10. The system of claim 9 wherein the third computer serves as a gateway of the private computer network.

11. The system of claim 9 wherein the third computer is configured to monitor DNS queries involving the first computer.

12. The system of claim 9 wherein the reputation of the domain name of the second computer includes a rating of the second computer.

* * * * *